United States Patent [19]
Armstrong

[11] Patent Number: 5,542,047
[45] Date of Patent: Jul. 30, 1996

[54] DISTRIBUTED NETWORK MONITORING SYSTEM FOR MONITORING NODE AND LINK STATUS

[75] Inventor: Robert E. Armstrong, Hunt Valley, Md.

[73] Assignee: Texas Instruments Incorporated, Dallas, Tex.

[21] Appl. No.: 690,031

[22] Filed: Apr. 23, 1991

[51] Int. Cl.$^6$ .......................... G06F 11/00; G06F 15/00
[52] U.S. Cl. .................... 395/200.11; 364/225.6; 364/241.7; 364/242.96; 364/DIG. 1
[58] Field of Search ...................... 395/200, 575, 395/800

[56] References Cited

U.S. PATENT DOCUMENTS

| | | | |
|---|---|---|---|
| 4,532,625 | 7/1985 | Stover | 370/58.1 |
| 5,109,486 | 4/1992 | Seymour | 395/200 |
| 5,115,495 | 5/1992 | Tsuchiya et al. | 395/200 |
| 5,121,390 | 6/1992 | Farrell et al. | 370/94.1 |
| 5,125,075 | 6/1992 | Goodale et al. | 395/200 |

*Primary Examiner*—Kevin J. Teska
*Assistant Examiner*—Ayni Mohamed
*Attorney, Agent, or Firm*—Robert L. Troike; Leo N. Heiting; Richard L. Donaldson

[57] ABSTRACT

A distributed network monitor system distributes the network monitoring function among each of the nodes of a multiple network system, such that monitor software resident in each node is responsible for providing status information about that node and its communications links. At predetermined monitoring intervals, a circulating status table (CST) (FIG. 4) is circulated to all of the on-line nodes, with each node updating the CST with its link and status information. The monitor software (FIG. 1) includes a servicer task (22), a node monitor task (24), and a packet manager task (26), with intertask data transfers being implemented through a monitor region (28) in memory. In addition to link and node status information, the CST includes information about links that are in an intermittent condition (i.e., links with significantly degraded statistical performance). Intermittent link conditions are determined by a voting procedure in which each node votes on the condition of its links with other nodes, with the results of the votes being distributed in the CST and used by each node to determine those nodes with links in an intermittent condition. For those links without sufficient message traffic to make a clear determination of condition, volunteer nodes send additional link test messages until sufficient statistical information is available.

33 Claims, 1 Drawing Sheet

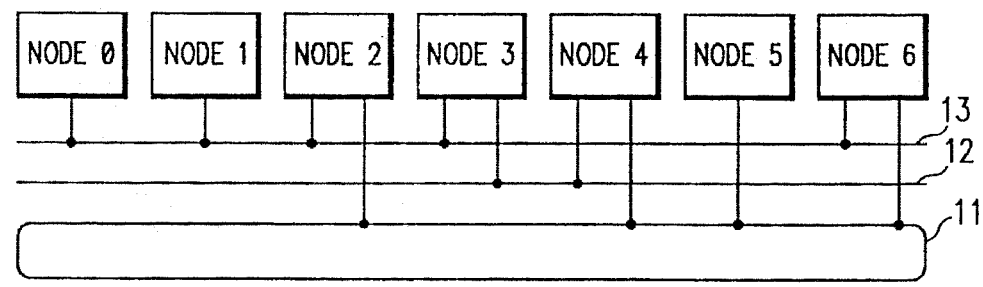
FIG. 1
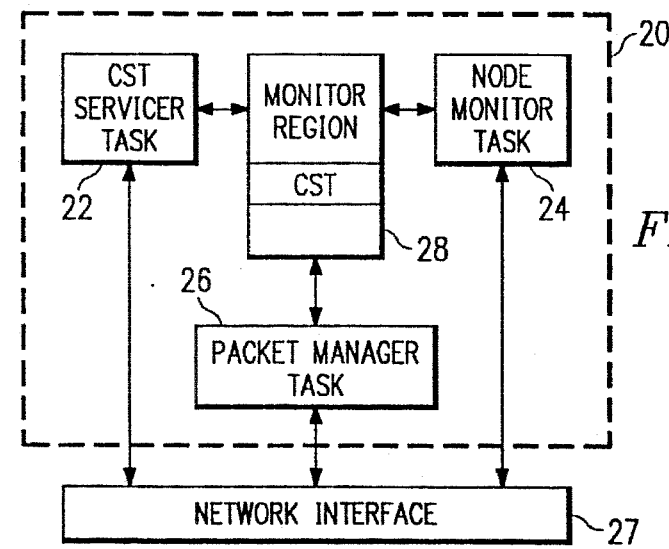
FIG. 2
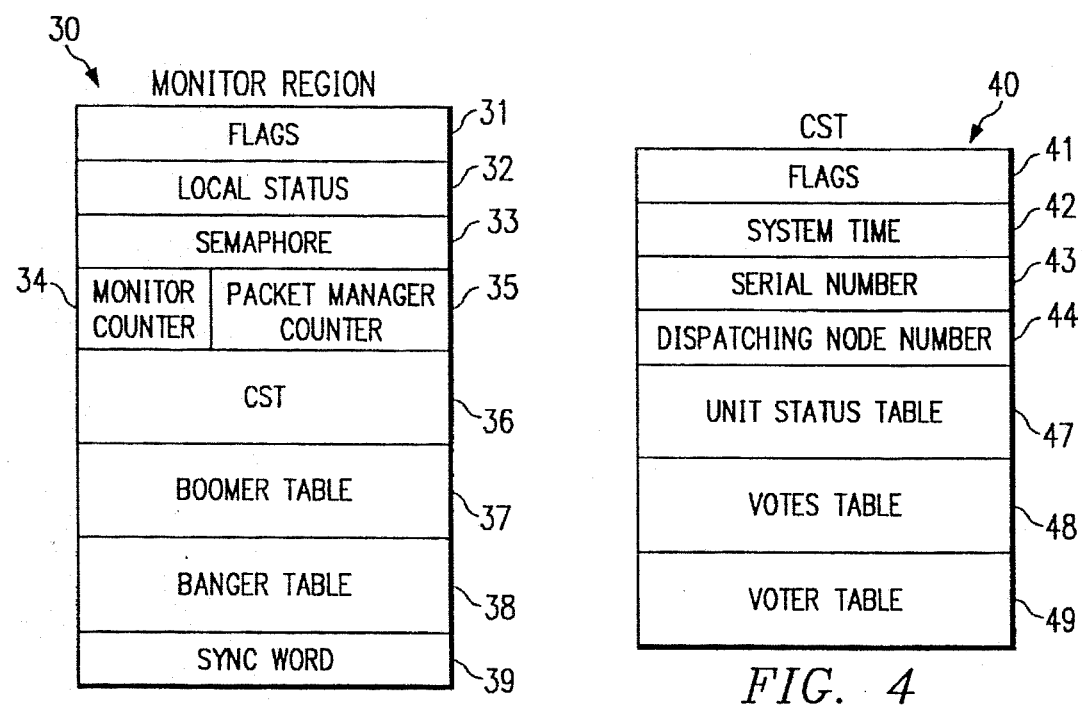
FIG. 3
FIG. 4

DISTRIBUTED NETWORK MONITORING SYSTEM FOR MONITORING NODE AND LINK STATUS

TECHNICAL FIELD OF THE INVENTION

The invention relates generally to computer network systems, and more particularly relates to a distributed network monitoring software system for monitoring the status of network nodes and links. In even greater particularity, the distributed monitoring system uses a circulating status table (CST) that is passed in sequence to each node, which writes its status information into the CST and reads the status information for all other nodes—the condition of communications links can be determined using an adaptive voting procedure to identify intermittent links.

BACKGROUND OF THE INVENTION

Computer network systems often include network monitoring software systems to monitor the status of network nodes and links. The network monitoring software typically resides above the network driver level, maintaining information about the status of nodes on the network and providing information to the network drivers on the status of the communication links between nodes.

The specific problem to which the invention has application is implementing network monitoring for multiple interconnected networks in which two nodes on different networks are required to communicate through a third node that operates as a bridge node between the networks. Such multiple network systems may be of the same type, such as two ethernets, or dissimilar, such as an ethernet and a token ring.

The current approach to network monitoring systems relies on a master monitor system resident in a node designated as the master. The master monitor implements all of the processing associated with determining the status of all nodes on the network, and distributing that status to the other nodes.

A master monitor system cannot be used unless the master monitor resident in the master node can establish a communication link to every other node on the system. In particular, the master monitor system is not compatible with a multiple network architecture in which a node on one network and a node on a second network can both communicate with a bridge node, but cannot communicate directly with each other.

In addition, a master oriented system necessarily requires that substantially all monitor processing be performed by the master monitor node. Thus, even if a master oriented system could be configured for multiple-network architectures, if the bridge node fails, the monitor system would be lost for those nodes on the side of the bridge node opposite the master monitor node.

Moreover, current master monitor systems do not provide any information about the condition of links that, while on-line and useable, nevertheless offer significantly degraded performance. In particular, identifying whether a performance degradation is caused by a source or destination node is problematic, even with statistical data on link attempts and errors that is available from many communications drivers.

Accordingly, a specific need exists for a network monitor architecture compatible with multiple networks in which two nodes on different networks are still able to communicate by routing through a bridge node. Ideally, such a network monitoring system would include an improved procedure for positively determining those nodes with intermittent communications links.

SUMMARY OF THE INVENTION

The invention is a distributed network monitor system in which the network monitoring function is distributed among each of the nodes of a network system, such that monitor software resident in each node is responsible for providing status information about that node and its communications links.

In one aspect of the invention, the distributed network monitoring technique includes dispatching, at predetermined monitoring intervals, a circulating status table (CST) from a node designated as a dispatching node to other nodes that are on-line such that the CST circulates according to a adaptive routing sequence and returns to the dispatching node after the CST has circulated to each on-line node. At each node receiving the CST, the node writes selected status information about such node into the CST and reads selected status information about the other nodes.

In an exemplary embodiment of the invention, the distributed network monitoring system is used in a network system in which the network nodes are on multiple dissimilar networks—such as a token ring and two ethernets—with at least one bridge node between each network. The CST is circulated according to an adaptive routing sequence in which each on-line node first determines which other on-line nodes have not received the CST, and then passes it either (a) to another on-line node that has not received the CST, or (b) if all on-line nodes for which the source node has a direct link have received the CST, to an intermediate node that does have a link to a node that has not seen the CST. The last on-line node in the routing sequence indicates in the CST that the dispatching node has not received the CST, and then allows the normal routing mechanism to route the CST back to the dispatching node.

If a node fails in an attempt to pass the CST to another node that according to the adaptive routing sequence would be the destination node (because either that node or a bridge node has gone off-line), this communications failure is indicated in the CST and the CST is passed according to the adaptive routing sequence to another node. When the CST returns to the dispatching node, any node that has not received the CST is marked as being off-line.

Off-line nodes are polled during polling intervals to determine if they have become on-line. For each link, each on-line node polls each off-line node having an identification number that falls between the identification numbers for the polling node and the next on-line node.

If each bridge node between two networks goes off-line, a dispatching node is automatically designated for the two now separate networks, and each dispatching node circulates a respective CST among the on-line nodes of its network. When a bridge node between the networks is brought back on-line, a dispatching node for the multiple network system is designated, and any CST dispatched by a node other than that dispatching node is eliminated.

The status information about each node contained in the CST includes condensed node status (off-line, load request, standby, on-line), and network link status (up or down) for each link. In addition, each node stores information about the condition of links in the network system, and in particular about links that are in an intermittent condition (i.e., links with significantly degraded statistical performance).

Intermittent link conditions are determined by a voting procedure for each link in which: (a) at predetermined voting intervals (such as every minute), the dispatching node circulates a request for each on-line nodes to vote on the condition of the links associated with other on-line nodes; (b) each on-line node responds to the voting request by voting on whether any such link is intermittent according to predetermined statistical criteria based on communications attempts and errors (such as one error in 10 attempts); and (c) the voting results are compiled in the CST for distribution to each node, which then use the voting results to determine which links to which nodes are in an intermittent link condition. A node will only vote on those communications links for which it has had a predetermined minimum number of communication attempts (such as twenty).

If enough votes to make a determination about whether the condition of any link for any node is intermittent are not available, such link is indicated to have an indeterminate link condition. To resolve an indeterminate link condition for a node (a) two on-line volunteer nodes able to communicate with such node over the indeterminate link each send boomerang messages every second, such that the volunteer node is able to vote on the condition of the link for such node during a subsequent voting interval.

To implement the voting procedure, the CST includes two tables: a votes table containing, for each node, a count of the number of votes and the number of intermittent link votes, and a voter table containing the node identification of the last node to vote intermittent for each node.

The technical advantages of the invention include the following. The monitor function, and the processing associated with that function, is distributed, instead of being tied to a specific master node—node and link status is contained in a circulating status table that is circulated among, and maintained current by, the on-line nodes of a network. The monitor system can be used with multiple networks, which may be dissimilar, in which two nodes on different networks are still able to communicate by routing through a bridge node. The circulating status table can contain information about links that, while operational, nevertheless suffer sufficient performance degradation to be classified as having an intermittent condition. An adaptive voting procedure is used to determine which on-line nodes have intermittent links, so that all such nodes operate with the same information regarding intermittent link conditions.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which:

FIG. 1 is a functional illustration of an exemplary multiple network system, with one token ring and two ethernets, for which the distributed network monitor system of the invention could be used to provide network monitoring;

FIG. 2 illustrates the architecture of the node monitor software resident in each node of the network system being monitored;

FIG. 3 illustrates the format of the Monitor Region used by the monitor software, which includes space allocated for the circulating status table (CST); and FIG. 4 illustrates the format of the CST, including the Status Table, Votes Table, and Voter Table.

DETAILED DESCRIPTION OF THE INVENTION

The Detailed Description of an exemplary embodiment of the distributed network monitor system is organized as follows:
1. Exemplary Network System
2. Distributed Monitor System
   2.1 General Configuration
   2.2. Monitor Region
   2.3. Circulating Status Table
      2.3.1. CST Format
      2.3.2. Routing Sequence
   2.4. Node Status Monitoring
   2.5. Link Status Monitoring
   2.6. Designating Dispatching Nodes
   2.7. Voting Procedure for Intermittent Links
      2.7.1. Voting Procedure
      2.7.2. Intermittent Link Condition
      2.7.3. Indeterminate Link Condition
3. Conclusion The exemplary distributed network monitor system is used to monitor a network system with multiple dissimilar networks (a token ring and two ethernet networks). However, the invention has general applicability for systems of single or multiple networks.

1. Exemplary Network System

FIG. 1 illustrates an exemplary network system including a token ring network 11, and two ethernet networks 12 and 13. Nodes 0 and 1 are coupled only to ethernet 13. Node bridges between token ring 11 and ethernet 13. Node 3 bridges between the two ethernets. Node 4 bridges between token ring 11 and ethernet 12. Node 5 is coupled only to the token ring. Node 6 bridges between the token ring and ethernet 13.

A communications driver in each node handles link selection and message traffic, through the network card.

This network architecture provides message routing so that two nodes without a common communications link can still communicate through a bridge node. Thus, node 0 is able to communicate messages with node 5 through either of the bridge nodes 2 or 6. Message routing is accomplished conventionally—typically, a message to be routed is sent to the bridge node with a flag indicating that the message should be forwarded (the answer automatically follows the same path back).

The distributed monitor system does not make use of this message routing capability, although the information it provides to the communications drivers supports this function.

2. Distributed Monitor System

The exemplary distributed monitoring system distributes the monitor function of determining the status of the nodes, and the communications (comm) links for those nodes. At each on-line node, the monitor function is implemented by a node monitor software that resides above the network level.

When a node is brought on-line, the node monitor software 20 is loaded, and handles all tasks associated with implementing the monitor function for that node. The principal monitor function implemented by the node monitor software at the on-line nodes is the circulation and maintenance of a circulating status table (CST)—each on-line node receiving the CST writes its status into the CST and reads the status of all other nodes from the CST.

One of the on-line nodes—the node with the lowest node identification number—is designated as a dispatching node that coordinates the distributed monitor function, and in particular, initiates the circulation of the CST. However, the duties of the dispatching node handled solely by the dispatching node are significantly less involved than in the case of a master node in a master oriented monitor system.

2.1 General Configuration

FIG. 2 functionally illustrates the configuration of a node monitor software 20. It comprises two principal tasks that implement the monitor function, including the circulation of the CST: a CST servicer task 22 and a node monitor task 24. A packet manager task 26 provides an interface between the node monitor software and a communications driver 27, such as a conventional network card. Intertask communication among the CST servicer task, the node monitor task, and the packet manager task is handled through a Monitor Region 28 allocated in memory.

The servicer task generally implements the circulation of the CST, including updating the status of its node and its comm links. The monitor task operates independent of the circulation of the CST in performing various background communication functions associated with maintaining the CST, including polling off-line nodes and notifying the servicer task when a node has been brought on-line. In addition, to identify those links in an intermittent condition, the servicer task implements the voting procedure for identifying intermittent links, sometimes directing the node monitor task to increase message traffic over a link to obtain sufficient statistical data upon which to base a vote on the condition of that link. In implementing these functions, the CST servicer and network monitor tasks communicate directly over the network through the communications driver.

The packet manager task receives unsolicited message packets, of which CST-type packets are directed into the monitor region. The CST is received as an unsolicited message, and in addition, the packet manager task occasionally receives unsolicited boomerang messages from other monitor tasks to test individual links. For the exemplary node monitor software, the packet manager task is implemented as a subroutine of the communications interface software for the node, which receives all unsolicited message packets for the node.

2.2. Monitor Region

FIG. 3 illustrates the format of a Monitor Region 30, which holds the CST, along with other data that is passed between the CST servicer task, the node monitor task, and the packet manager task. The Monitor Region includes a header 31 containing a flag word and mapped areas for node status 32, semaphores 33, node monitor watchdog counter 34, and packet manager watchdog counter 35. In addition, the Monitor Region provides storage for the CST 36, a Boomerang Table 37, a Link Condition Table 38, and a Sync Word 39.

The header Flag Word includes a New CST bit, a Lock bit, a Restart bit, and a Valid bit.

The New CST bit indicates to the CST servicer task that the packet manager task has received a CST as an unsolicited packet over the network, and has put it in the Monitor Region. After putting the CST in the Monitor Region and setting this bit, the packet manager task wakes up the CST servicer task, such as by using a semaphore.

The Restart Bit is set by the node monitor task to indicate to the CST servicer task that the timeout period for the CST has expired and a new CST should be formatted and transmitted—typically used when the node is unable to receive the CST either because the dispatcher node or a bridge node goes off-line. The monitor wakes up the CST servicer task in the same way the packet manager task does.

The Valid Bit is set by the CST servicer task whenever it receives a valid CST from the packet manager task. This bit is watched by the node monitor task and causes the task to reset its timeout timer.

The Lock Bit can be used to limit access to the Monitor Region.

The two watchdog counters—for the node monitor task and the packet manager task—ensure that both tasks are running properly. The counter for each task is continuously reset by that task and decremented by the other task. If the watchdog counter for one of the tasks is not reset, the other task will detect a time-out, assume that the other task has stopped operating, and shut down the monitor software in the node.

2.3. Circulating Status Table

The CST contains the status of nodes in the network system, as determined by the implementation of the distributed network monitor function. At regular one second monitoring intervals, the designated dispatching node dispatches the CST, which circulates among the on-line nodes of the network according to an adaptive routing sequence.

2.3.1. CST Format

FIG. 4 illustrates the format of a CST 40, which resides in the Monitor Region. The CST includes a header 41 that contains a Flag Word, together with fields for system time 42, serial number 43, dispatching node number 44. In addition, the CST includes three tables: a node status table 47, a votes table 48, and a voter table 49.

The header Flag word includes bits for New Time, Time Update Request, Net1 data or voting, Net2 data or voting, Net3 data or voting, Intermittent voting/data, and Initial CST.

The New Time bit is a flag to all on-line nodes that the time value in the System Time field is correct and that they should update their system times. The dispatching node sets this bit and loads the System Time field in response to the expiration of an hour timer, and also when a node sets the Time Update Request bit.

The Time Update Request bit is set by a node when it is first loaded, informing the dispatching node to send out the correct system time on the next pass of the CST.

The next four bits are used to coordinate the votes and vote data distribution for the intermittent link voting procedure described in Section 2.7. The Intermittent voting/data bit specifies that either a vote is taking place or the results of a vote are being distributed. The other three bits—Net1, Net2, and Net3— are respectively for each of the possible network links in the exemplary network system, specifying the particular link for which the voting or data is available. All these bits are set and cleared by the dispatching node.

The voting sequence is as follows: Net1 Vote, Net1 Data Distribution, Net2 Vote, Net2 Data distribution, Net3 Vote, Net3 Data Distribution. These events occur on successive passes of the CST. The dispatching node uses the value in the Serial Number field (which is a count of the number of CST circulations) to determine when to start the voting process—when the lower 6 bits of the serial number are zero the voting begins. Assuming the CST is circulating normally at once every second, voting will take place about every 64 seconds, although the timing is not critical.

The Initial CST bit is set by the dispatching node when a new CST is sent at the beginning of a monitoring interval as a result of a timeout. The on-line destination nodes treat this CST as any other but no status data is read from the CST. Once the CST makes a complete pass, the dispatching node clears the Initial CST bit, and the CST circulates normally.

The System Time field contains the system time as updated by the dispatching node. It is only valid when the System Time bit in the Flag Word is set.

The Serial Number field is a seven bit value that is incremented each time the CST makes a complete pass through the system. The dispatching node uses this number both to detect multiple CSTs that may have been transmitted by the same dispatching node because of a time-out condition being reached before a CST returns, and also to time the voting process.

The Dispatching Node field contains the identification number of the dispatching node. In the exemplary embodiment, the dispatching node is the lowest numbered node in the system that is running.

The Node Status table contains a status byte for each node in the network. According to the distributed network monitor function, each node updates this field with its own node and link status each time the CST is received.

The format of each status field in this table is as follows: Net1 Link Up, Net2 Link UP, Net3 Link Up, Condensed Status (two bits), Selected/Not Selected, and Represented/ Unrepresented, plus a spare bit.

The Net1, Net2, and Net3 Link Up bits indicate the link status of the three possible network communications links accessible by the node.

The Condensed Status bits indicate one of four possible node statuses: Off-line, Load Request, Standby, On-line. Typically, these status values will also be maintained in the communications driver.

The Selected/Not Selected bit is used to specify the selected node of a redundant pair.

The Represented/Unrepresented bit is cleared for all nodes by the dispatching node prior to initiating a CST pass. Each on-line node sets this bit when it updates the CST with its status and then passes the CST (in addition, an on-line node will set this bit for those nodes that it attempts to pass the CST but are in Load Request or Standby). When all on-line nodes that can see the CST have seen it (i.e., all their Represented bits are set), the CST routing sequence is complete and it is returned to the dispatching node for final processing.

Any node that doesn't have it's Represented bit set when the dispatching node gets the CST back is assumed to be off-line, and the dispatching node sets the condensed status for that node accordingly.

2.3.2. Routing Sequence

The CST servicer task in each node controls the circulation of the CST among the on-line nodes according to an adaptive routing sequence. The CST servicer task in the dispatching node initiates a CST pass each one second monitoring interval.

The dispatching node is defined to be the lowest numbered node running in the system—when the dispatching node goes off-line, or when a bridge node goes off-line such that the CST cannot be routed to some of the nodes of the network system, then the new lowest numbered node takes over the dispatching node duties (See Section 2.6). In addition to circulating the CST, the dispatching node is responsible for changing on-line/off-line status and implementing the intermittent link voting procedure, as well as most of the error checking involving the CST.

The CST servicer task in each on-line node is responsible for updating the status data in the CST for its node, and then transmitting the CST through the communications driver to the next node in the routing sequence. It also reads status data from the CST, and makes it available to the communications driver.

For each node of the network system, the CST servicer task retrieves from the CST (a) the network(s) over which that node can communicate, and (b) a Represented/Unrepresented bit specifying whether that node has yet received the CST on the current pass (i.e., since the CST last left the dispatching node). With this routing information, the CST servicer task can determine which node should be the next node in the routing sequence.

Basically, at an on-line node with the CST, the CST servicer task first determines from the CST which other non-off-line nodes have not yet received the CST (i.e., nodes that are on-line, in load request, or standby). If the source CST servicer task has a direct link to one of these remaining destination nodes, it then tries to pass the CST directly to that destination node—if more than one node qualifies, the CST is passed to the node with the lowest identification number. If not, the source CST servicer task determines which other on-line nodes have a direct link to one of the remaining destination nodes, and then passes the CST to such intermediate node (even though it has already received the CST). If no such first-level indirect route is available, the source CST servicer task determines which on-line nodes have a direct link to another on-line node that has a direct link to one of the remaining destination nodes, and then passes the CST to such second-level intermediate node (even though it has already received it). And, so on.

When an intermediate node receives the CST, it implements this routing process without regard to being an intermediate node—the routing process ensures that the CST will be passed over an indirect route to an on-line node that has not seen it. The number of levels of indirectness in this routing process depends upon the number of links in the network system.

Thus, network monitoring is not effected by situations where one node is not able to communicate directly with a second node so long as it is able to communicate with an intermediate node that can communicate with the second node—in FIG. 1, node 0 is able to communicate with node 5 through either bridge node 2 or 6.

The CST servicer task may be unable to pass the CST to a particular node identified as the next node in the routing sequence because either (a) the node does not respond to the request to pass the CST (even after a predetermined number of retries) and therefore is assumed to have gone off-line, or (b) the node responds the request by indicating that it is in Load Request or Standby, and therefore unable to accept the CST at that time. In the former case, the CST servicer task indicates in the CST that the link between its node and the destination node on which the attempt was made is off-line for the target the node (such node may still be on-line and able to be reached over another link). In the latter case, the CST servicer task indicates in the CST that the destination node is either in Load Request or Standby, and sets the Represented/Unrepresented bit for the destination node to indicate that the destination node should be represented in this CST.

Once all on-line nodes have received the CST, and have set the associated Represented/Unrepresented bit in the Node Status Table, it is routed back to the node with the lowest identification number, which is deemed to be the dispatching node. Specifically, the last node in the routing sequence detects the condition in which all Represented/ Unrepresented bits for the on-line nodes have been set, and no path can be found to a node for which the Represented/ Unrepresented bit has not been set (i.e., a node with a link to a node for which the Represented/Unrepresented bit has not been set has marked that link as being off-line). At this point, the node clears the Represented/Unrepresented bit for the dispatching node to indicate that is has not received the CST, allowing the completed CST to circulate back to the dispatching node according to the normal routing mechanism.

The CST servicer task in the dispatching node performs housekeeping on the CST, and then sends it out on the next pass during the next one second monitoring interval. The serial number contained in the CST Serial Number field is incremented each time the dispatching node determines the CST has been through all the on-line nodes in the system. The dispatching node also keeps track of the last serial number it sent out so that multiple CSTs can be eliminated from the system (i.e., any CST reaching the dispatching node without the proper serial number is discarded). The serial number is modulo 128 and, as a side effect, causes the voting process for intermittent links to start when the lower 6 bits are zeroes.

The dispatching node distributes a system time to all other nodes each hour by putting the system time in the CST and setting the New Time bit in the CST header Flag Word indicating, that all nodes should update their system time with the new time. Each node keeps track of any timeout that occurs in the passing of the CST, and if necessary updates the time in the CST, so that the time will be correct when it reaches every other node.

2.4. Node Status Monitoring

At each node, the node monitor task is responsible for identifying changes in node status for nodes that are listed as off-line in the CST (the Condensed Status bits in the Node Status Table). This node status monitoring function operates continuously, independent of the operation of the CST servicer task in circulating the CST.

The dispatching node is responsible for changing the node status of a node from on-line to off-line. The CST servicer task in the dispatching node checks the CST to determine those nodes for which the Represented/Unrepresented bit has not been set, and marks as off-line those nodes indicated in the CST as not having received the CST (i.e., those nodes that could not be reached over any direct or indirect communications link). These nodes are considered off-line because their status is not attainable—the node may actually be running but not in CST path for that dispatching node.

Such off-line nodes may be on the other side of a bridge node that has gone off-line, and may in fact be operational. In this case the nodes separated from the main system will initiate a separate distributed network monitoring sub-system, and eventually the lowest numbered node of that group will start a CST for the sub-system (see, Section 2.6). Once the bridge node is brought back on-line, the sub-system will once again become part of the main system and the extra CST will be eliminated by the dispatching node for the whole system.

The monitor software running in each on-line node is responsible for indicating that a node has changed node status from off-line to Load Request, Standby, and eventually On-line. In the on-line nodes, the node monitor tasks routinely poll all nodes listed as off-line in the CST—the goal is that a node coming on-line will not have to wait long to be identified by an on-line node, and to have its node status in the CST (Node Status Table) changed accordingly, enabling it to receive the CST and participate in the monitor operation.

At each on-line node, during regular one minute polling intervals, the node monitor task transmits a polling packet to each of the off-line nodes between itself and the on-line node with the next higher identification number. These unsolicited boomerang polling packets will be received by the packet manager task of the destination node if that node is On-line. In this way, all off-line nodes should be polled without more than one node monitor task polling the same off-line node—since a significant number of timeouts are to be expected, unnecessary overlap should be minimized. Each network communications link is treated separately for this polling process.

Referring to FIG. 3, the Boomerang Table 37 in the Monitor Region 30 is used by the node monitor task and the packet manager task in connection with modifying the node status in the CST for previously off-line nodes. When a boomerang polling packet is successfully communicated to an off-line destination node, the sending node monitor task sets an appropriate flag in the Boomerang Table to indicate that the a link to that node is now available for use.

The CST servicer task does a logical OR of the Boomerang Table into the Node Status Table of the CST prior to passing it on to the next on-line node—if a node with an off-line node status in the CST is indicated in the Boomerang Table to be no longer off-line, then the CST servicer task will appropriately set the node status in the CST to Load Request. The CST servicer task then passes the CST normally.

2.5. Link Status Monitoring

In each node, the node monitor task is responsible for determining link status for the network communications link(s) over which a node will attempt to communicate, as indicated by the link status bits in the CST (the Net* Link Up bits in the Node Status Table). This link monitor function is performed continuously, independent of the operation of the CST servicer task in circulating the CST, and independent of the normal message traffic over the network.

During regular link monitoring intervals (such as one second), the node monitor task attempts to communicate over each link to any other on-line node in the system for which that link is operational.

If a link communication failure is encountered, the node monitor task rotates through the other on-line nodes on the same link, attempting to find a node that can verify the operation of the link between the sending and destination nodes. The node monitor task only attempts to communicate with those nodes that show that the link under test is operational (as represented by the appropriate link status bit in the Node Status Table of the CST).

If the node monitor task fails to find a node to verify the link under test, it assumes such link has failed, and provides a corresponding indication in the node monitor region. The next time the CST passes through this node, the CST servicer task will read this status change from the node monitor region and update link status in the CST. In this manner, all other nodes will be advised about the link failure.

2.6. Designating Dispatching Nodes

The distributed network monitor system automatically designates new dispatching nodes at system power up, or when CST circulation is interrupted when either an existing dispatching or a bridge node goes off-line.

When CST circulation hasn't started or is interrupted, the node monitor task in each node not receiving a CST within a specified period will detect the expiration of a CST timer, and set the Restart Bit in the header Flag Word of the Monitor Region. In addition, the node monitor task will wake up the CST servicer task (such as with a semaphore), causing that task to format a new CST and transmit it over the network, or a sub-network in the case of a bridge node going off-line.

Typically, a number of nodes will transmit new CSTs at around the same time. The new dispatching node will be the node of a network or sub-network with the lowest identification number. Each CST includes a field for the serial number of the dispatching node. When a node that has dispatched a CST receives a CST with a higher identification number than its number, it discards that CST. This process continues until only the CST dispatched by the node with the lowest identification number is circulating.

2.7. Voting Procedure for Intermittent Links

The distributed network monitoring system uses a voting procedure to identify intermittent communications links between network nodes. As a result of the voting procedure, each node operates with an identical list of intermittent links, providing such information to the communications driver to control the routing of messages over the network.

An intermittent link is a link between nodes that, while still operational, has suffered a degradation in performance according to predetermined statistical criteria based on the ratio of errors and attempts for such link. For example, ethernet systems commonly assign intermittent link conditions to node links that have an error rate in excess of one error per ten attempts. All such designations are on a node by node basis since many failure modes will be localized to a single node.

The distributed network monitor system is capable of identifying intermittent links, and reporting them to the communication drivers in each node such that they can automatically use other links in routing messages to a particular node. If possible, the communications driver will route a message through a bridge node to avoid using an intermittent link. However, the intermittent link can still be used if no other link is available.

2.7.1. Voting Procedure

Since a node cannot determine by itself whether a failure of the communication link between itself and another node is the result of a local problem or a problem on the other node, more information is necessary. The communications driver in each node keeps track of the attempts and errors that occur between itself and each other node, and this information is used by each node to vote on the status of the links for other nodes with which it communicates.

During voting intervals that begin every minute, the voting procedure is initiated by the dispatching node, which circulates a voting request to each on-line node. The dispatching node first directs the nodes to vote on the performance of the first network link by setting a bit in the header Flag Word of the CST (the Net1 Data or Voting bit).

The CST circulates through the on-line nodes, and the CST servicer task in each node votes by setting appropriate bits in the Votes Table and Voters Table in the CST. Each node votes on the performance of the link under consideration for other nodes based on its statistical experience in terms of attempts and errors with the link under consideration. That is, a vote is based on the error rate over a link under consideration, with a an error rate of 0.1 or worse denoting a intermittent link.

A node is permitted to vote on the performance of a link for another node only of it has sufficient experience communicating with that node to be deemed to have a statistically valid opinion. For the exemplary embodiment, a node must have made at least twenty attempts to another node over the link under consideration to vote on the performance of that link. If a node does not have sufficient attempts for a statistically valid opinion, it does not participate in the vote, but rather, only indicates that it considered voting. In addition, all nodes set a bit indicating they voted to prevent a node from voting twice.

When the CST returns to the dispatching node, its node CST servicer task sets a bit in the CST header Flag Word (the Intermittent Data/Voting bit) indicating that the vote is complete for that network, and that the results of the vote are available in the Votes and Voters Table in the CST. On subsequent passes of the CST, this voting procedure is repeated for the other networks.

2.7.2. Intermittent Link Condition

Intermittent link determinations are made by each node based on the results of the voting procedure, which are contained in the CST Votes and Voters Tables. Since all nodes receive the same Votes and Voters Tables, all nodes will reach the same conclusion regarding which links are intermittent.

The Votes Table contains a byte for each node, with each byte having the format: Total Votes Counter (three bits), Intermittent Votes Counter (three bits), and Volunteer 1 and Volunteer 2 bits.

The Total Votes bits are a three bit count of the nodes voting on the status of this nodes link. The number of bits required for this counter, and the total count, depends upon how much resolution is needed for the intermittent link determination. For the exemplary embodiment, this count is clamped at seven.

The Intermittent Votes bits are also a three bit count but they count the total intermittent votes. Again, for the exemplary embodiment, this count is clamped at seven.

The Volunteer 1 and Volunteer 2 bits are used when a node receives an indeterminate vote during a vote pass of the CST (see, Section 2.7.3).

The Voter Table contains a byte for each node, with each byte having the following format: Voting Node (6 bits) and Voting Indicator bit.

The Voting Node bits are the node number of the first node to vote intermittent for a link. If a node designated by this field is the only node to vote intermittent on a link, then that node has an intermittent link.

The Vote Indicator bit is set by each node as it votes or reads the vote data from the CST. Since it is possible for a node to receive CST more than once on the same pass, this bit prevents a node from voting twice or reading the voting results in the Votes Table twice.

The intermittent link determination based on the voting results in the Votes Table and the Voter Table can best be described with the following chart listing the possible combinations of votes and voters for a particular node, and the conclusions drawn from each combination (such a chart could be constructed for each node from the voting results in the CST):

| | INTERMITTENT LINK DETERMINATION TABLE ENTRY FOR NODE X | | |
|---|---|---|---|
| | Votes | | |
| Voter | Total | Intermittent | Conclusion |
| Y | >1 | >1 | Node X has an intermittent link |
| Y | >1 | 1 | Node Y has an intermittent link |
| Y | 1 | 1 | Indeterminate |
| — | 1 | 0 | No problems |
| — | 0 | 0 | No Problems |

The first two and last two rows describe link conditions that are conclusive. Any node reading these voting results from the CST Voters Table would make the same determination indicated in the chart. In particular, in the first two situations, the intermittent link determination would be recorded in the Link Condition Table in the Monitor Region (38 in FIG. 3), and then passed to the communications driver (along with other node and link status information gained from the normal circulation of the CST).

The third row describes a link condition that is indeterminate in that an intermittent link has been detected but the source of the errors cannot be determined from the data in the Votes Table (i.e., either X or Y could be the source of the intermittent condition). More voters are needed to vote on the condition of node X's link so that the results can be made conclusive.

2.7.3. Indeterminate Link Condition

When the voting procedure results in an indeterminate vote (i.e., link condition is indeterminate), nodes other than those involved (the node voted on and the node that voted) are used to produce more data for the following vote. These nodes become volunteers in the voting procedure by forcing communications to the node that was voted on over the link under consideration.

When an indeterminate condition for a link between two nodes is detected by a CST servicer task that is resident in a third node that is able to communicate over that link, it instructs the node monitor task to send boomerang messages to node with the indeterminate link condition each second until the next vote takes place. In terms of the above chart, the node monitor task in a node that is not node X or Y will send repeated boomerang messages to node X over the link under test, thereby increasing message traffic over the link to obtain sufficient statistical data upon which to base a vote on the link's condition.

In this way, the next vote on node X will contain more than one voter, and should produce conclusive results. At most, two nodes will volunteer for this link condition testing process, with the decision to volunteer being made by the CST servicer task that detects an indeterminate vote condition.

The Link Condition Table in the Monitor Region which holds the information on intermittent links, also holds the information on links with indeterminate condition. The Link Condition Table contains a byte for each node, with each byte having the following format: Test Net1, Test Net2, Test Net3, Net1 is Intermittent, Net2 is Intermittent, Net3 is Intermittent.

The Test Net* bits are used to designate which links for the node are in an indeterminate condition, based on an intermittent link determination using the most recent voting results.

The Net* Intermittent bits are set after the vote data in the Votes and Voters Tables is evaluated and a conclusive intermittent link determination made.

The Link Condition Table is cleared at the start of a vote, and refilled after the new vote is complete—intermittent link conditions and indeterminate link conditions are not carried over.

When a CST servicer task decides to volunteer for a link condition test operation to resolve a link's indeterminate condition, it first checks the two Volunteer bits in the CST Votes Table to determine whether two nodes have already volunteered. If not, it sets one of the Volunteer bits, and also sets one of the Test Net* bits in the Link Condition Table, which is read by the node monitor task. The node monitor task responds by sending boomerang messages to the designated node over the designated link each second.

When the next vote is taken, the nodes that volunteered will have made enough attempts to the node in question to render a statistically valid vote on the performance of the link in question. As a result, the condition of a link should be indeterminate for at most one vote cycle.

2.6.4. Intermittent Link Recovery

If a node detects that one of its links has been voted intermittent, it will force the intermittent votes to continue to show such link as intermittent until that node can determine that such link is no longer intermittent.

A node forces this intermittent vote condition by stuffing the CST Votes Table with all intermittent link votes. This intermittent link recovery process prevents a link voted intermittent from vacillating between intermittent and non-intermittent.

An intermittent link will be considered not intermittent if it can go from one vote to the next without an error. Since, at each node, the node monitor task is continually checking link status, during each voting interval about 25 to 30 communication attempts will be made for each link, including any link voted intermittent.

Once an intermittent link passes this test, the node simply stops forcing the vote to intermittent, and allows a normal vote to take place.

3. Conclusion

Although the Detailed Description of the invention has been directed to certain exemplary embodiments, various modifications of these exemplary embodiments, as well as alternative embodiments, will be suggested to those skilled in the art. For example, some functions performed by the node monitor task in testing links might be performed by the underlying communications driver. Also, the voting procedure could be implemented in a master oriented or other monitor system such as by having the master monitor poll each node for votes.

It is to be understood that the invention encompass any modifications or alternative embodiments that fall within the scope of the appended claims.

What is claimed is:

1. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes.

2. The distributed network monitoring method of claim 1, wherein the network nodes are on multiple networks with at least one bridge node between each network, and wherein the step of circulating the CST is accomplished by:

at each on-line node with the CST, passing the CST to another on-line node that has not received the CST and for which the on line node passing the CST has a link;

or if all on-line nodes for which the on line node passing the CST has a link have received the CST, passing the CST to an on-line node that can pass the CST to an on-line node that has not received the CST.

3. The distributed network monitoring method of claim 1, wherein each network node is assigned a unique identification number, and wherein the node with the lowest identification number is designated as the dispatching node.

4. The distributed network monitoring method of claim 1, wherein the selected status information associated with each node comprises link status information about the status of links associated with the node, and node status information about the status of the node.

5. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; wherein the return of the CST to the dispatching node is accomplished by the step of:

at a last on-line node, indicating in the CST that the dispatching node has not received the CST, and passing the CST, such that it circulates back to the dispatching node; and at each node that receives the CST, writing selected status information about such node into the CST and reading selected status information about the other nodes.

6. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes; wherein the CST indicates whether each node is on-line or off-line, further comprising the steps:

if a node fails in an attempt to pass the CST to an on-line node, indicating in the CST such failure and passing the CST to another node and when the CST returns to the dispatching node, indicating in the CST that any previously on-line node that has not received the CST is off-line.

7. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes; wherein the CST indicates whether each node is on-line or off-line, further comprising the steps of:

at predetermined polling intervals, polling off-line nodes to determine if they are no longer off-line and for each polled node discovered to be on-line, indicating in the CST that such node is on-line.

8. The distributed network monitoring method of claim 7, wherein each node is assigned a unique identification number, and wherein the step of polling off-line nodes is accomplished by each on-line node polling each off-line node with an identification number that falls between the identification number of the polling node and the on-line node with the next higher identification number.

9. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes; wherein the network nodes are on multiple networks with at least one bridge node between each network, further comprising the steps of:

if each bridge node between two networks goes off-line, designating a dispatching node for each such network; and circulating a respective CST among the on-line nodes of each network.

10. The distributed network monitoring method of claim 9, further comprising the steps of:

if an off-line bridge node is brought back on-line, designating one of the respective dispatching nodes as a new dispatching node; and eliminating any CST not dispatched by such new dispatching node.

11. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes;

said selected status information associated with each node comprises link status information about the status of links associated with the node, and node status information about the status of the node, wherein the link status information comprises an indication of whether a link is up or down, and the node status information comprises an indication of whether the node is on-line or off-line.

12. A distributed network monitoring method for monitoring the status of network nodes and communication links, comprising the steps:

at predetermined monitoring intervals, dispatching a circulating status table (CST) from a node designated as a dispatching node to other nodes that are on-line;

circulating the CST to each on-line node, and then returning the CST to the dispatching node; and at each node that receives the CST, writing selected status information about such node into the CST and reading selected status information about the other nodes; wherein the CST indicates that, for each node, the condition of a link is intermittent if the performance of that link is significantly degraded.

13. The distributed network monitoring method of claim 12, wherein intermittent link conditions are determined by a voting procedure comprising the steps:

at each node, logging communications attempts and errors that occur between such node and the other nodes;

at predetermined voting intervals, circulating from the dispatching node a request for each on-line node to vote on the condition of its link with other on-line nodes;

at each on-line node, responding to the voting request by voting on whether its link to another on-line node is intermittent according to predetermined statistical criteria based on such node's log of attempts/errors over such link; and compiling the votes from each of the on-line nodes, and assigning an intermittent link condition to each link having a predetermined minimum number of intermittent link votes.

14. The distributed network monitoring method of claim 13, wherein each on-line node only votes on those links to other on-line nodes for which such node has had a predetermined minimum number of communication attempts, otherwise indicating no opinion in response to a voting request.

15. The distributed network monitoring method of claim 14, further comprising the steps of:

for each on-line node, assigning an indeterminate condition to those links to other on-line-nodes for which not enough votes are available to make a determination about whether such link should be assigned an intermittent link condition; and at each of a selected number of on-line volunteer nodes able to communicate with another on-line node over an indeterminate condition link, sending a predetermined number of test messages to such other node over such indeterminate condition link such that the volunteer node is able to vote on the condition of such link during a subsequent voting interval.

16. The distributed network monitoring method of claim 15, further comprising the step of:

at an on-line node with an indeterminate condition link, responding to a voting request by forcing the vote on that link to indicate an intermittent condition until such node is able to communicate over such link with a predetermined minimum number of errors over a voting interval.

17. The distributed network monitoring method of claim 14, wherein the CST includes two tables: a votes table containing, for each node, a count of the number of votes and the number of intermittent condition votes, and a voter table containing the node identification of the last node to vote intermittent for each node.

18. A distributed network monitoring method for monitoring the status of network nodes and communication links in a network system of multiple networks with at least one bridge node between each network, comprising the steps:

at predetermined monitoring intervals, dispatching a circulating status table (CST) from a node designated as a dispatching node to other nodes that are on-line, and then returning the CST to the dispatching node;

at each on-line node with the CST, passing the CST to another on-line node that has not received the CST and for which the passing node has a link;

or if all on-line nodes for which the node passing the CST has a link have received the CST, passing the CST to an on-line node that can pass the CST to an on-line node that has not received the CST;

at each node that receives the CST, writing selected status information about such node into the CST and reading selected status information about the other nodes.

19. A distributed network monitoring method for monitoring the status of network nodes and communication links in a network system of multiple networks with at least one bridge node between each network, comprising the steps:

at predetermined monitoring intervals, dispatching a circulating status table (CST) from a node designated as a dispatching node to other nodes that are on-line, and then returning the CST to the dispatching node;

at each on-line node with the CST, passing the CST to another on-line node that has not received the CST and for which a node passing the CST has a link;

or if all on-line nodes for which a passing node passing the CST has a link have received the CST, passing the CST to an on-line node that can pass the CST to an on-line node that has not received the CST;

at each node that receives the CST, writing selected status information about such node into the CST and reading selected status information about the other nodes; wherein the CST indicates whether each node is on-line or off-line, and wherein each node is assigned a unique identification number, further comprising the steps of:

at predetermined polling intervals, polling each off-line node with an identification number that falls between the identification number of the polling node and the on-line node with the next higher identification number to determine if such polled nodes are no longer off-line; and for each polled node discovered to be on-line, indicating in the CST that such node is on-line.

20. A distributed network monitoring method for monitoring the status of network nodes and communication links in a network system of multiple networks with at least one bridge node between each network, comprising the steps:

at predetermined monitoring intervals, dispatching a circulating status table (CST) from a node designated as a dispatching node to other nodes that are on-line, and then returning the CST to the dispatching node;

at each on-line node with the CST, passing the CST to another on-line node that has not received the CST and for which a node passing the CST has a link;

or if all on-line nodes for which the node passing the CST has a link have received the CST, passing the CST to an on-line node that can pass the CST to an on-line node that has not received the CST;

at each node that receives the CST, writing selected status information about such node into the CST and reading selected status information about the other nodes;

if each bridge node between two networks goes off-line, designating a dispatching node for each such network; and circulating a respective CST among the on-line nodes of each network; and then when an off-line bridge node is brought back on-line, designating one of the respective dispatching nodes as a new dispatching node, and eliminating any CST not dispatched by such new dispatching node.

21. A distributed network monitoring method for monitoring the status of network nodes and communication links in a network system of multiple networks with at least one bridge node between each network, comprising the steps:

at predetermined monitoring intervals, dispatching a circulating status table (CST) from a node designated as a dispatching node to other nodes that are on-line, and then returning the CST to the dispatching node;

at each on-line node with the CST, passing the CST to another on-line node that has not received the CST and for which a node passing the CST has a link;

or if all on-line nodes for which the node passing the CST has a link have received the CST, passing the CST to an on-line node that can pass the CST to an on-line node that has not received the CST;

at each node that receives the CST, writing selected status information about such node into the CST and reading selected status information about the other nodes; wherein the CST indicates that, for each node, the condition of a link is intermittent if the performance of that link is significantly degraded, and wherein intermittent link conditions are determined by a voting procedure comprising the steps:

at each node, logging communications attempts and errors that occur between such node and the other nodes;

at predetermined voting intervals, circulating from the dispatching node a request for each on-line node to vote on the condition of its link with other on-line nodes;

at each on-line node, responding to the voting request by voting on whether its link to another on-line node is intermittent according to predetermined statistical criteria based on such node's log of attempts/errors over such link, but only if such on-line node has had a predetermined minimum number of communication attempts, otherwise indicating no opinion in response to a voting request; and compiling the votes from each of the on-line nodes, and assigning an intermittent link condition to each link having a predetermined minimum number of intermittent link votes.

22. The distributed network monitoring method of claim 21, further comprising the steps of:

for each on-line node, assigning an indeterminate condition to those links to other on-line nodes for which not enough votes are available to make a determination about whether such link should be assigned an intermittent link condition; and at each of a selected number of on-line volunteer nodes able to communicate with another on-line node over an indeterminate condition link, sending a predetermined number of test messages to such other node over such indeterminate condition link such that the volunteer node is able to vote on the condition of such link during a subsequent voting interval.

23. A distributed network monitoring software system for monitoring the status of network nodes and communication links, where each node includes communications driver software for communicating message packets among the nodes of the network, comprising:

at each node, monitor software including at least a servicer task and a node monitor task, and further including a monitor region of memory for implementing intertask data transfers;

a circulating status table (CST) including selected status information about each node and the associated communications links;

at each node, said node monitor task continuously sends link test packets to other on-line nodes for testing the status of such other nodes and associated communications links, and provides corresponding status data into said monitor region;

at predetermined monitoring intervals, said servicer task of a node designated as a dispatching node circulates the CST to each on-line node, such that the CST returns to the dispatching node after being passed to each on-line node;

at each node that receives the CST, said servicer task reads selected status information from said monitor region and correspondingly updates the status information in the CST, and reads selected status information about the other nodes from the CST.

24. A distributed network monitoring software system for monitoring the status of network nodes and communication links, where each node includes communications driver software for communicating message packets among the nodes of the network, comprising:

at each node, monitor software including at least a CST servicer task and a node monitor task, and further including a monitor region of memory for implementing intertask data transfers;

a circulating status table (CST) including selected status information about each node and the associated communications links;

at each node, said node monitor task continuously sends link test packets to other on-line nodes for testing the status of such other nodes and associated communications links, and provides corresponding status data into said monitor region;

at predetermined monitoring intervals, said CST servicer task of a node designated as a dispatching node circulates the CST to each on-line node, such that the CST returns to the dispatching node after being passed to each on-line node;

at each node that receives the CST, said CST servicer task reads selected status information from said monitor region and correspondingly updates the status information in the CST, and reads selected status information about the other nodes from the CST; wherein the network nodes are on multiple networks with at least one bridge node between each network, and wherein CST circulation is accomplished by:

at each on-line node with the CST, said CST servicer task passes the CST to another on-line node that has not received the CST and for which the passing node has a link;

or if all on-line nodes for which the node passing the CST has a link have received the CST, said CST servicer task passes the CST to an on-line node that can pass the CST to an on-line node that has not received the CST.

25. The distributed network monitoring system of claim 24, wherein:

at the last on-line node receiving the CST, said CST servicer task indicates in the CST that the dispatching node has not received the CST, and then passing the CST, such that it circulates back to the dispatching node.

26. A distributed network monitoring software system for monitoring the status of network nodes and communication links, where each node includes communications driver software for communicating message packets among the nodes of the network, comprising:

at each node, monitor software including at least a CST servicer task and a node monitor task, and further including a monitor region of memory for implementing intertask data transfers;

a circulating status table (CST) including selected status information about each node and the associated communications links;

at each node, said node monitor task continuously sends link test packets to other on-line nodes for testing the status of such other nodes and associated communications links, and provides corresponding status data into said monitor region;

at predetermined monitoring intervals, said CST servicer task of a node designated as a dispatching node circulates the CST to each on-line node, such that the CST returns to the dispatching node after being passed to each on-line node;

at each node that receives the CST, said CST servicer task reads selected status information from said monitor region and correspondingly updates the status information in the CST, and reads selected status information about the other nodes from the CST, wherein the CST indicates whether each node is on-line or off-line, and wherein:

at predetermined polling intervals, said node monitor task polls off-line nodes to determine if they are no longer off-line, and, for each polled node discovered to be on-line, indicates in the monitor region that such node is on-line.

27. A distributed network monitoring software system for monitoring the status of network nodes and communication links, where each node includes communications driver software for communicating message packets among the nodes of the network, comprising:

at each node, monitor software including at least a CST servicer task and a node monitor task, and further including a monitor region of memory for implementing intertask data transfers;

a circulating status table (CST) including selected status information about each node and the associated communications links;

at each node, said node monitor task continuously sends link test packets to other on-line nodes for testing the status of such other nodes and associated communications links, and provides corresponding status data into said monitor region;

at predetermined monitoring intervals, said CST servicer task of a node designated as a dispatching node circulates the CST to each on-line node, such that the CST returns to the dispatching node after being passed to each on-line node;

at each node that receives the CST, said CST servicer task reads selected status information from said monitor region and correspondingly updates the status information in the CST, and reads selected status information about the other nodes from the CST; wherein the CST indicates that, for each node, the condition of a link is intermittent if the performance of that link is significantly degraded, wherein the communications driver at each node logs communications attempts and errors that occur between such node and the other nodes, and wherein:

at predetermined voting intervals, said CST servicer task at the dispatching node circulates a request for each on-line node to vote on the condition of its link with other on-line nodes;

at each on-line node, said CST servicer task responds by voting on whether its link to another on-line node is intermittent according to predetermined statistical criteria based on such node's log of attempts/errors over such link; and said CST servicer task at each on-line node comprises the votes from each of the on-line nodes, and assigns an intermittent link condition to each link having a predetermined minimum number of intermittent link votes.

28. The distributed network monitoring method of claim 27, wherein each on-line node only votes on those links to other on-line nodes for which such node has had a predetermined minimum number of communication attempts, otherwise indicating no opinion in response to a voting request.

29. The distributed network monitoring method of claim 28, wherein:

at each on-line node, said CST servicer task assigns an indeterminate condition to those links to other on-line nodes for which not enough votes are available to make a determination about whether such link should be assigned an intermittent link condition; and at each of a selected number of on-line volunteer nodes able to communicate with another on-line node over an indeterminate condition link, said CST servicer task directs said node monitor task to send a predetermined number of link test messages to such other node over such indeterminate condition link such that the volunteer node is able to vote on the condition of such link during a subsequent voting interval.

30. A link-condition voting method for determining when the condition of a link between nodes of a network system is intermittent because the performance of that link is significantly degraded, comprising the steps:

at each node, logging communications attempts and errors that occur between such node and the other nodes;

at predetermined voting intervals, circulating from a dispatching node a request for each on-line node to vote on the condition of its link with other on-line nodes;

at each on-line node, responding to the voting request by voting on whether its link to another on-line node is intermittent according to predetermined statistical criteria based on such node's log of attempts/errors over such link; and compiling the votes from each of the on-line nodes, and assigning an intermittent link condition to each link having a predetermined minimum number of intermittent link votes.

31. The distributed network monitoring method of claim 30, wherein each on-line node only votes on those links to other on-line nodes for which such node has had a predetermined minimum number of communication attempts, otherwise indicating no opinion in response to a voting request.

32. A link-condition voting method for determining when the condition of a link between nodes of a network system is intermittent because the performance of that link is significantly degraded, comprising the steps:

at each node, logging communications attempts and errors that occur between such node and the other nodes;

at predetermined voting intervals, circulating from a dispatching node a request for each on-line node to vote on the condition of its link with other on-line nodes;

at each on-line node, responding to the voting request by voting on whether its link to another on-line node is intermittent according to predetermined statistical criteria based on such node's log of attempts/errors over such link; and compiling the votes from each of the on-line nodes, and assigning an intermittent link condition to each link having a predetermined minimum number of intermittent link votes;

wherein each on-line node only votes on those links to other on-line nodes for which such node has had a predetermined minimum number of communication attempts, otherwise indicating no opinion in response to a voting request:

for each on-line node, assigning an indeterminate condition to those links to other on-line nodes for which not enough votes are available to make a determination about whether such link should be assigned an intermittent link condition; and at each of a selected number of on-line volunteer nodes able to communicate with another on-line node over an indeterminate condition link, sending a predetermined number of test messages to such other node over such indeterminate condition link such that the volunteer node is able to vote on the condition of such link during a subsequent voting interval.

33. A link-condition voting method for determining when the condition of a link between nodes of a network system is intermittent because the performance of that link is significantly degraded, comprising the steps:

at each node, logging communications attempts and errors that occur between such node and the other nodes;

at predetermined voting intervals, circulating from a dispatching node a request for each on-line node to vote on the condition of its link with other on-line nodes;

at each on-line node, responding to the voting request by voting on whether its link to another on-line node is intermittent according to predetermined statistical criteria based on such node's log of attempts/errors over such link; and compiling the votes from each of the on-line nodes, and assigning an intermittent link condition to each link having a predetermined minimum number of intermittent link votes; and at an on-line node with an indeterminate condition link, responding to a voting request by forcing the vote on that link to indicate an intermittent condition until such node is able to communicate over such link with a predetermined minimum number of errors over a voting interval.

* * * * *